(12) United States Patent
Mizuno et al.

(10) Patent No.: US 11,705,565 B2
(45) Date of Patent: Jul. 18, 2023

(54) FUEL CELL SYSTEM

(71) Applicant: TOYOTA JIDOSHA KABUSHIKI KAISHA, Toyota (JP)

(72) Inventors: Nobukazu Mizuno, Nagakute (JP); Shigeki Hasegawa, Toyota (JP); Miyu Haga, Susono (JP); Seiichi Tanaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/534,751

(22) Filed: Nov. 24, 2021

(65) Prior Publication Data

US 2022/0255099 A1    Aug. 11, 2022

(30) Foreign Application Priority Data

Feb. 8, 2021    (JP) .................. 2021-018585

(51) Int. Cl.
| | | |
|---|---|---|
| *H01M 8/04746* | (2016.01) | |
| *H01M 8/04089* | (2016.01) | |
| *H01M 8/04119* | (2016.01) | |
| *H01M 8/04082* | (2016.01) | |
| *H01M 8/0438* | (2016.01) | |

(52) U.S. Cl.
CPC ..... *H01M 8/04761* (2013.01); *H01M 8/0438* (2013.01); *H01M 8/04097* (2013.01); *H01M 8/04156* (2013.01); *H01M 8/04201* (2013.01); *H01M 2250/20* (2013.01)

(58) Field of Classification Search
CPC ......... H01M 8/04761; H01M 8/04097; H01M 8/04156; H01M 8/04201; H01M 8/0438; H01M 2250/20; H01M 8/04164; H01M 8/04388; H01M 8/04; H01M 8/04089; H01M 8/04432; H01M 8/0662
USPC ........................................... 429/427
See application file for complete search history.

(56) References Cited

U.S. PATENT DOCUMENTS

| | | | | |
|---|---|---|---|---|
| 8,927,161 | B2 * | 1/2015 | Kobayashi ........ | H01M 8/04201 429/415 |
| 2007/0248858 | A1 * | 10/2007 | Blaszczyk ......... | H01M 8/04104 429/454 |
| 2010/0323252 | A1 * | 12/2010 | Kobayashi ........ | H01M 8/04425 429/415 |

(Continued)

FOREIGN PATENT DOCUMENTS

JP    2019067708 A    4/2019

*Primary Examiner* — Christian Roldan
(74) *Attorney, Agent, or Firm* — Dickinson Wright, PLLC

(57) ABSTRACT

A fuel cell system includes a fuel cell stack, a fuel gas supply path, an injector, an ejector, a circulation path, a pressure difference detection unit that detects a pressure difference between an ejector inlet port pressure and an ejector outlet port pressure, and a control device. The control device calculates a required circulation flow rate that is required for a fuel off gas supplied from the fuel cell stack to the ejector, based on a required load for the fuel cell stack, calculates an estimated circulation flow rate that is an estimated flow rate of the fuel off gas supplied from the fuel cell stack to the ejector, based on the required load and the pressure difference, and increases the flow rate of a fuel gas supplied from the injector to the fuel cell stack when the estimated circulation flow rate is lower than the required circulation flow rate.

1 Claim, 5 Drawing Sheets

(56) References Cited

U.S. PATENT DOCUMENTS

2015/0118588 A1* 4/2015 McLean ............ H01M 8/04208
  429/421
2019/0296376 A1* 9/2019 Mizumoto ........ H01M 8/04753

* cited by examiner

FUEL CELL SYSTEM

CROSS-REFERENCE TO RELATED APPLICATION

This application claims priority to Japanese Patent Application No. 2021-018585 filed on Feb. 8, 2021, incorporated herein by reference in its entirety.

BACKGROUND

1. Technical Field

The technology disclosed herein relates to a fuel cell system.

2. Description of Related Art

Japanese Unexamined Patent Application Publication No. 2019-67708 (JP 2019-67708 A) discloses a fuel cell system that includes a fuel cell stack, a fuel gas supply path through which a fuel gas is supplied to the fuel cell stack, an injector provided in the fuel gas supply path, an ejector provided in the fuel gas supply path and provided between the injector and the fuel cell stack, a circulation path through which a fuel off gas discharged from the fuel cell stack is supplied to the ejector, and a control device.

SUMMARY

In general, when there is a shortage of a fuel gas to be supplied to a fuel cell stack, hydrogen which can be used for power generation by the fuel cell stack may become short, and the fuel cell stack may be degraded. It is conceivable to supply a large amount of fuel gas to the fuel cell stack in advance so that hydrogen that can be used for power generation by the fuel cell stack will not become short. When a large amount of fuel gas is supplied to the fuel cell stack in advance, however, the amount of fuel gas to be consumed may be increased to reduce the fuel efficiency.

The present specification provides a technique, in which degradation of a fuel cell stack can be suppressed and the fuel efficiency can be improved in a fuel cell system including an ejector.

An aspect disclosed herein relates to a fuel cell system including: a fuel cell stack; a fuel gas supply path through which a fuel gas is supplied to the fuel cell stack; an injector provided in the fuel gas supply path; an ejector provided in the fuel gas supply path and provided between the injector and the fuel cell stack; a circulation path through which a fuel off gas discharged from the fuel cell stack is supplied to the ejector; a pressure difference detection unit that detects a pressure difference between an ejector inlet port pressure that is a pressure in the circulation path between the fuel cell stack and the ejector, and an ejector outlet port pressure that is a pressure in the fuel gas supply path between the ejector and the fuel cell stack; and a control device. The control device may be configured to: calculate a required circulation flow rate that is a flow rate required for the fuel off gas to be supplied from the fuel cell stack to the ejector, based on a required load for the fuel cell stack; calculate an estimated circulation flow rate that is an estimated value of a flow rate of the fuel off gas supplied from the fuel cell stack to the ejector, based on the required load and the pressure difference; and increase a flow rate of the fuel gas to be supplied from the injector to the fuel cell stack when the estimated circulation flow rate is lower than the required circulation flow rate.

In the configuration described above, the control device increases the flow rate of the fuel gas to be supplied from the injector to the fuel cell stack when the estimated circulation flow rate is lower than the required circulation flow rate. This increases the amount of hydrogen to be supplied to the fuel cell stack, and increases the hydrogen concentration at the outlet port of the ejector. Therefore, it is possible to suppress a shortage of hydrogen which can be used for power generation by the fuel cell stack, and suppress degradation of the fuel cell stack, in a situation in which the estimated circulation flow rate is lower than the required circulation flow rate. In addition, it is possible to suppress supply of an unnecessarily large amount of fuel gas to the fuel cell stack in a situation in which the estimated circulation flow rate is equal to or higher than the required circulation flow rate. Thus, the fuel efficiency of the fuel cell system can be improved.

The fuel cell system may further include: a gas-liquid separator provided in the circulation path to separate liquid water contained in the fuel off gas and store the liquid water; an exhaust-drainage path connected to the gas-liquid separator; and an exhaust-drainage valve provided in the exhaust-drainage path. The control device may be configured to specify a required upper limit value and a required lower limit value which correspond to the ejector outlet port pressure based on the required load, stop driving the injector when the ejector outlet port pressure is equal to or more than the required upper limit value with the injector in a driven state, and start driving the injector when the ejector outlet port pressure is equal to or less than the required lower limit value with the injector in a stopped state. The control device may switch the exhaust-drainage valve to an open state to exhaust a nitrogen gas contained in the fuel off gas in the gas-liquid separator to outside when the estimated circulation flow rate is lower than the required circulation flow rate and the required upper limit value specified based on the required load is equal to or more than a predetermined upper limit pressure value.

It is occasionally not desirable to make the ejector outlet port pressure more than a predetermined upper limit value. Even in such a situation, it is necessary to suppress a shortage of hydrogen that can be used for power generation by the fuel cell stack. In the configuration described above, the control device switches the exhaust-drainage valve to the open state when the estimated circulation flow rate is lower than the required circulation flow rate and the required upper limit value that is specified based on the required load, is equal to or more than the predetermined upper limit value. When the exhaust-drainage valve is switched to the open state, a nitrogen gas contained in the fuel off gas in the gas-liquid separator is exhausted to the outside through the exhaust-drainage path. Therefore, the hydrogen concentration at the outlet port of the ejector can be increased. Also with such a configuration, it is possible to suppress a shortage of hydrogen that can be used for power generation by the fuel cell stack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
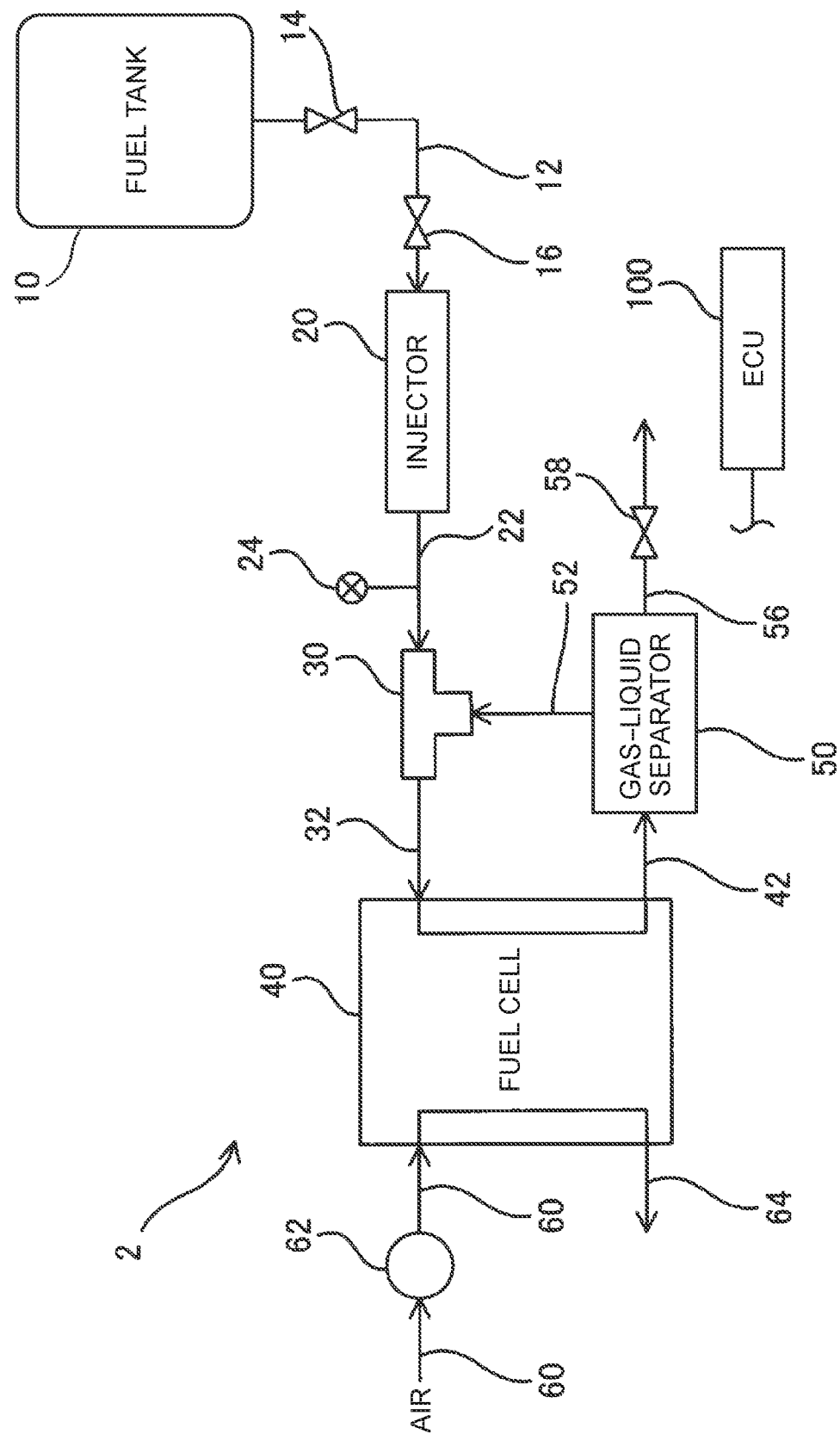
FIG. 1 is a schematic diagram of a fuel cell system according to the present embodiment.

A fuel cell system 2 will be described with reference to FIG. 1. The fuel cell system 2 includes a fuel tank 10, an injector 20, an ejector 30, a fuel cell stack 40, a gas-liquid separator 50, and an electronic control unit (ECU) 100. The fuel cell system 2 is mounted on a fuel cell vehicle, for example.

The fuel cell stack 40 is a device that generates electric power through a chemical reaction between hydrogen and oxygen. Water is generated through the chemical reaction between hydrogen and water. The fuel cell stack 40 includes a plurality of unit cells (not illustrated). Each of the unit cells includes a fuel electrode and an air electrode. A fuel gas (hydrogen gas) is supplied to the fuel electrode and air containing oxygen is supplied to the air electrode to generate electricity. The electric power generated by the fuel cell stack 40 is supplied to a travel motor of the fuel cell vehicle, for example. An unreacted fuel gas (hereinafter referred to as a "fuel off gas") that was not used in the power generation by the fuel cell stack 40 is discharged from the fuel cell stack 40. The fuel off gas contains water generated during the power generation in the form of vapor.

The fuel tank 10 stores a fuel gas (a hydrogen gas in the present embodiment) to be supplied to the fuel cell stack 40. The upstream end portion of a first fuel supply path 12 is connected to the fuel tank 10. The downstream end portion of the first fuel supply path 12 is connected to the injector 20. The first fuel supply path 12 is provided with a main check valve 14 and a pressure reduction valve 16, which are arranged in this order from the upstream side to the downstream side. The main check valve 14 opens and closes the first fuel supply path 12. When the main check valve 14 is opened, a fuel gas is supplied from the fuel tank 10 to the fuel cell stack 40. When the main check valve 14 is closed, a fuel gas is not supplied from the fuel tank 10 to the fuel cell stack 40. The pressure reduction valve 16 regulates the pressure of a fuel gas that flows through the first fuel supply path 12. The pressure reduction valve 16 can reduce the pressure of a fuel gas to be supplied to the fuel cell stack 40 through the first fuel supply path 12.

The injector 20 regulates the pressure and the flow rate of a fuel gas to be supplied to the fuel cell stack 40. The injector 20 is an electromagnetic valve, for example. Hydrogen is supplied to the fuel cell stack 40 when the injector 20 is opened, and hydrogen is not supplied to the fuel cell stack 40 when the injector 20 is closed. The pressure and the flow rate of the fuel gas are regulated by regulating the degree of opening and the valve opening time of the injector 20. The upstream end portion of a second fuel supply path 22 is connected to the injector 20. The downstream end portion of the second fuel supply path 22 is connected to the ejector 30.

The second fuel supply path 22 is provided with a pressure sensor 24 that detects the pressure of a fuel gas in the second fuel supply path 22.

The upstream end portion of a third fuel supply path 32 is connected to the ejector 30. The downstream end portion of the third fuel supply path 32 is connected to the fuel cell stack 40. The downstream end portion of a gas circulation path 52 is also connected to the ejector 30. As discussed later, a fuel off gas is supplied to the gas circulation path 52. The ejector 30 suctions a fuel off gas that flows through the gas circulation path 52 using a flow of a fuel gas supplied from the second fuel supply path 22, mixes these gases, and dispenses the resulting gas to the third fuel supply path 32. Then, the gas dispensed to the third fuel supply path 32 is supplied to the fuel cell stack 40. Hereinafter, the first fuel supply path 12, the second fuel supply path 22, and the third fuel supply path 32 are occasionally referred to collectively as a "fuel supply path".

The downstream end portion of an air supply path 60 is connected to the fuel cell stack 40. The upstream end portion of the air supply path 60 is open to the outside. The air supply path 60 is provided with a compressor 62. The compressor 62 pumps air introduced into the air supply path 60 to the fuel cell stack 40. For example, air outside the fuel cell vehicle is supplied to the fuel cell stack 40 through the air supply path 60.

The upstream end portion of an exhaust gas path 42 is also connected to the fuel cell stack 40. The downstream end portion of the exhaust gas path 42 is connected to the gas-liquid separator 50. The fuel off gas is supplied to the gas-liquid separator 50 through the exhaust gas path 42. The upstream end portion of an air discharge path 64 is also connected to the fuel cell stack 40. The upstream end portion of the air discharge path 64 is open to the outside. Air that was not used in the power generation by the fuel cell stack 40 is discharged to the outside through the air discharge path 64.

The gas-liquid separator 50 separates water contained in the fuel off gas introduced into the gas-liquid separator 50 from the exhaust gas path 42, and stores the water. Water vapor contained in the fuel off gas introduced into the gas-liquid separator 50 is cooled, and condensed water (liquid water) is stored in the gas-liquid separator 50. For example, water vapor is cooled by outside air, and condensed water (liquid water) is stored in the gas-liquid separator 50.

The upstream end portion of the gas circulation path 52 is connected to the gas-liquid separator 50. A fuel off gas in the gas-liquid separator 50 is supplied to the ejector 30 through the gas circulation path 52. The fuel off gas introduced into the ejector 30 is supplied to the fuel cell stack 40 again through the third fuel supply path 32. Consequently, the fuel off gas discharged from the fuel cell stack 40 is supplied to the fuel cell stack 40 again to be used for power generation.

The upstream end portion of an exhaust-drainage path 56 is also connected to the gas-liquid separator 50. The downstream end portion of the exhaust-drainage path 56 is open to the outside. The exhaust-drainage path 56 is provided with an exhaust-drainage valve 58. When the exhaust-drainage valve 58 is opened, an unnecessary gas (mainly a nitrogen gas) and liquid water in the gas-liquid separator 50 flow to the outside. When the exhaust-drainage valve 58 is closed, an unnecessary gas (mainly a nitrogen gas) and liquid water in the gas-liquid separator 50 do not flow to the outside.

The ECU 100 includes a central processing unit (CPU) and a memory such as a read-only memory (ROM) and a random access memory (RAM). The ECU 100 specifies a load (required load) required for the fuel cell system 2, and controls operation of the injector 20 etc. such that a required current can be obtained.

Figure 2:
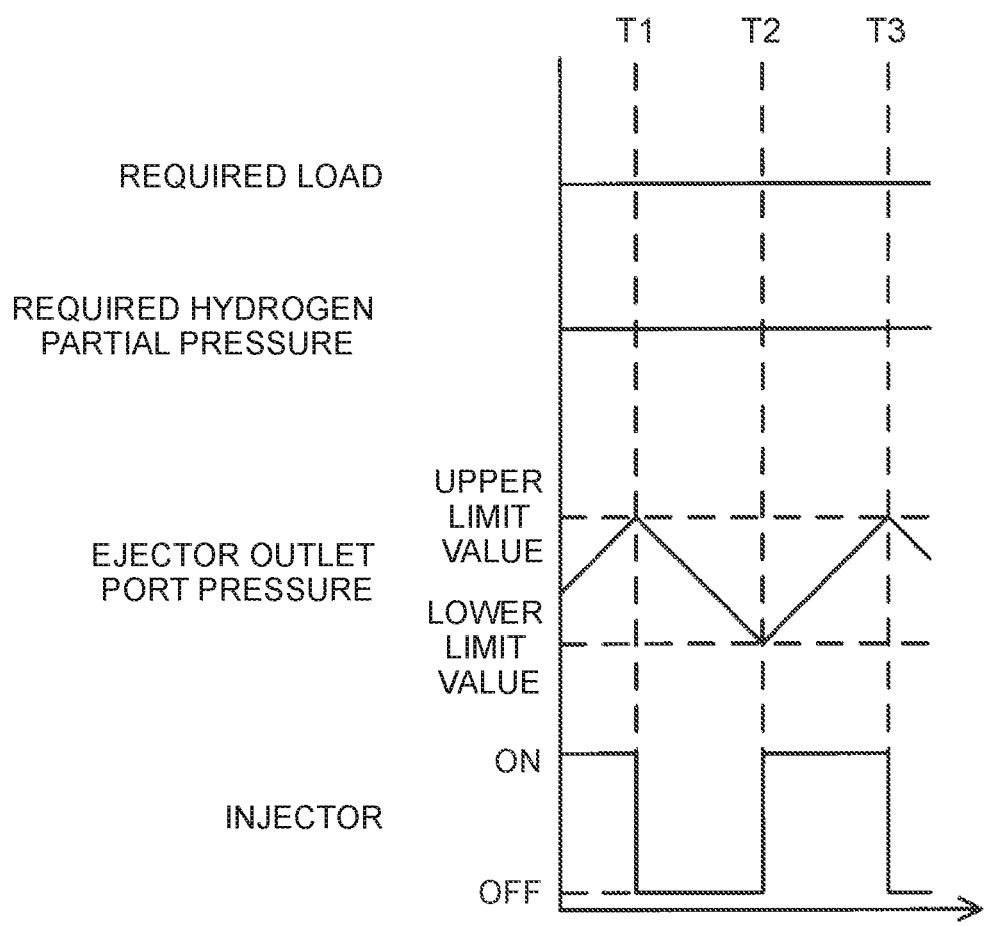
FIG. 2 is a time chart illustrating an example of operation of an injector according to the present embodiment.

Operation of the fuel cell system 2 that is controlled by the ECU 100 will be described with reference to FIG. 2. FIG. 2 is a time chart for a case where a required fuel load for the fuel cell system 2 is constant and an estimated circulation flow rate, to be discussed later, is higher than a required circulation flow rate, to be discussed later. The ECU 100 is configured to control on/off operation of the injector 20 based on an ejector outlet port pressure, which is the pressure in the third fuel supply path 32 between the ejector 30 and the fuel cell stack 40. Specifically, the ECU 100 controls operation of the injector 20 such that the ejector outlet port pressure falls within the range between a required upper limit value and a required lower limit value, to be discussed later. The ECU 100 is configured to be able to calculate the pressure at the outlet port of the ejector 30 based on the pressure of the fuel gas detected by the pressure sensor 24, the required load, the actual electric power generated by the fuel cell stack 40, etc.

The ECU 100 specifies the present required load, and specifies a target hydrogen partial pressure corresponding to the present required load as a required hydrogen partial pressure using the present required load. The required hydrogen partial pressure is a required value of a hydrogen partial pressure at the outlet port of the ejector 30. Next, the ECU 100 calculates a required upper limit value and a required lower limit value of the ejector outlet port pressure based on the required hydrogen partial pressure. Next, the ECU 100 stops driving the injector 20 when the ejector outlet port pressure is equal to or more than the required upper limit value in a state in which the injector 20 is driven (hereinafter occasionally referred to as a "driven state") (time T1). Next, the ECU 100 starts driving the injector 20 when the ejector outlet port pressure is equal to or less than the required lower limit value in a state in which the injector 20 is stopped (hereinafter occasionally referred to as a "stopped state") (time T2). Next, the ECU 100 stops driving the injector 20 when the ejector outlet port pressure is equal to or more than the required upper limit value with the injector 20 in the driven state (time T3).

Figure 3:
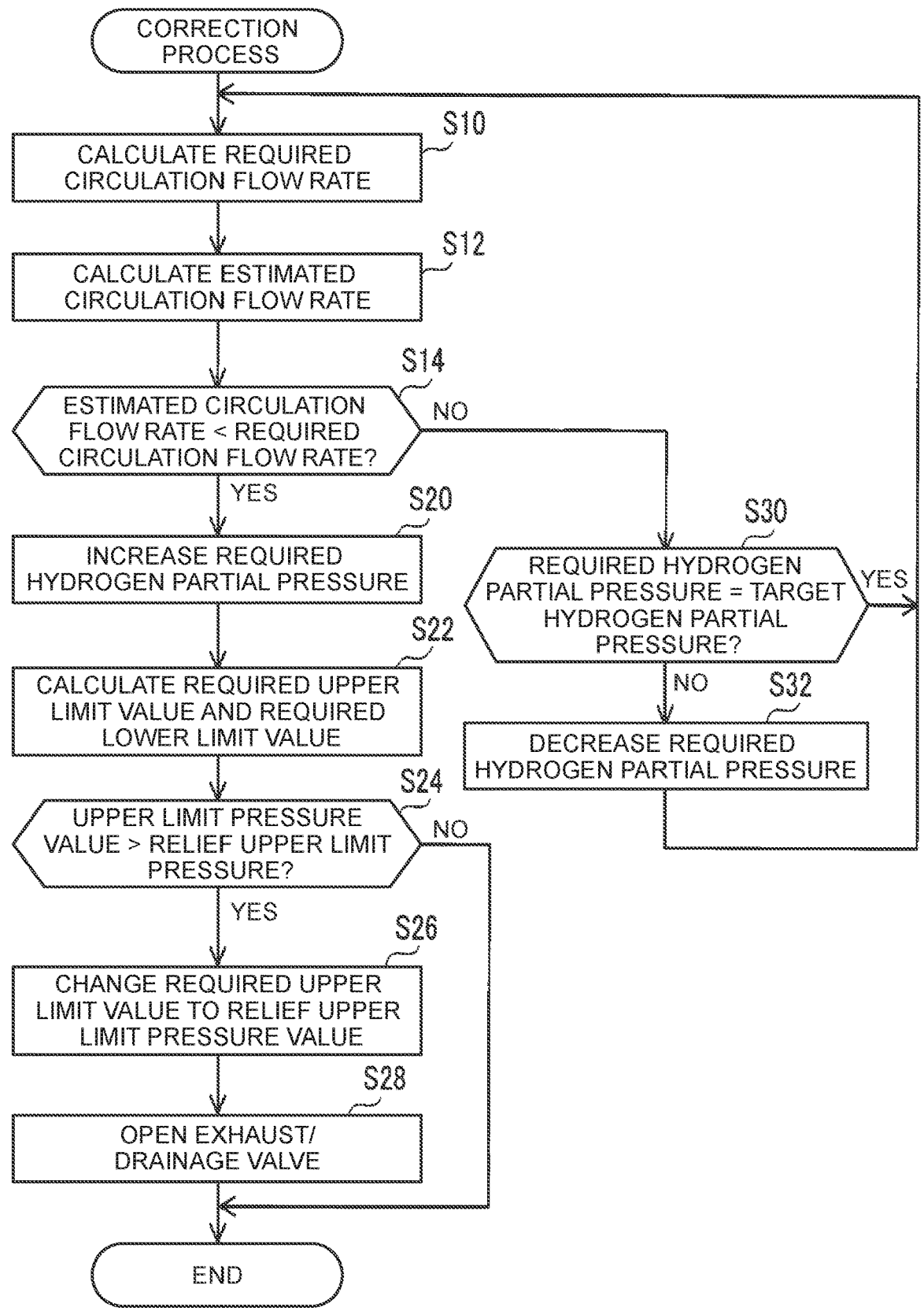
FIG. 3 is a flowchart of a correction process according to the embodiment.

Correction Process: FIG. 3

Subsequently, a correction process executed by the ECU 100 of the fuel cell system 2 will be described with reference to FIG. 3. The ECU 100 starts the process in FIG. 3 when the power of the vehicle on which the fuel cell system 2 is mounted is turned ON.

In step S10, the ECU 100 calculates the circulation flow rate of the fuel off gas required for the ejector 30 based on the required load for the fuel cell system 2. Hereinafter, the circulation flow rate calculated in step S10 will be occasionally referred to a "required circulation flow rate".

In step S12, the ECU 100 calculates the present circulation flow rate. First, the ECU 100 calculates the pressure difference between an ejector inlet port pressure, which is the pressure in the gas circulation path 52 between the gas-liquid separator 50 and the ejector 30, and the ejector outlet port pressure based on the pressure of the fuel gas detected by the pressure sensor 24, the required load, the actual electric power generated by the fuel cell stack 40, the operation state of the exhaust-drainage valve 58, etc. Next, the ECU 100 calculates the present circulation flow rate based on the pressure difference that has been calculated.

Hereinafter, the circulation flow rate calculated in step S12 will be occasionally referred to as an "estimated circulation flow rate".

In step S14, the ECU 100 determines whether the estimated circulation flow rate is lower than the required circulation flow rate. When the estimated circulation flow rate is lower than the required circulation flow rate, the ECU 100 determines YES in step S14, and proceeds to step S20. When the estimated circulation flow rate is not equal to or lower than the required circulation flow rate, on the other hand, the ECU 100 determines NO in step S14, and proceeds to step S30.

In step S20, the ECU 100 increases the required hydrogen partial pressure. The ECU 100 calculates an amount by which the required hydrogen partial pressure is to be increased (hereinafter referred to as an "additional hydrogen partial pressure") based on the difference between the required circulation flow rate and the estimated circulation flow rate. For example, the ECU 100 increases the additional hydrogen partial pressure, as the difference is larger. In modifications, the additional hydrogen partial pressure may be constant regardless of the magnitude of the difference. Next, the ECU 100 adds the additional hydrogen partial pressure to the present required hydrogen partial pressure to calculate a new required hydrogen partial pressure.

In step S22, the ECU 100 calculates the required upper limit value and the required lower limit value for the ejector outlet port pressure based on the required hydrogen partial pressure calculated in step S20.

In step S24, the ECU 100 determines whether the required upper limit value calculated in step S22 is more than a relief upper limit pressure value (an example of a "predetermined upper limit pressure value"). The relief upper limit pressure value is the allowable pressure of the fuel cell system 2. When the required upper limit value is more than the relief upper limit pressure value, the ECU 100 determines YES in step S24, and proceeds to step S26. When the required upper limit value is not equal to or more than the upper limit pressure value, on the other hand, the ECU 100 determines NO in step S24, and ends the process in FIG. 3.

In step S26, the ECU 100 changes the required upper limit value to the relief upper limit pressure value. In addition, the ECU 100 specifies, as the required lower limit value, a pressure value that is less than the relief upper limit pressure value by a first predetermined value.

In step S28, the ECU 100 switches the exhaust-drainage valve 58 from a closed state to an open state. When step S22 is finished, the ECU 100 ends the process in FIG. 3. The ECU 100 switches the exhaust-drainage valve 58 from the closed state to the open state when the required upper limit value is less than the relief upper limit pressure value by a second predetermined value or more. The second predetermined value is more than the first predetermined value.

In step S30, the ECU 100 determines whether the required hydrogen partial pressure and the target hydrogen partial pressure are equal to each other. When the required hydrogen partial pressure and the target hydrogen partial pressure are equal to each other, the ECU 100 determines YES in step S30, and returns to step S10. When the required hydrogen partial pressure and the target hydrogen partial pressure are different from each other, on the other hand, the ECU 100 determines NO in step S30, and proceeds to step S32. The required hydrogen partial pressure and the target hydrogen partial pressure are different from each other when the required hydrogen partial pressure is higher than the target hydrogen partial pressure as a result of the execution of the process in step S20.

In step S32, the ECU 100 reduces the required hydrogen partial pressure. When the process in step S32 is finished, the ECU 100 returns to step S10.

Figure 4:
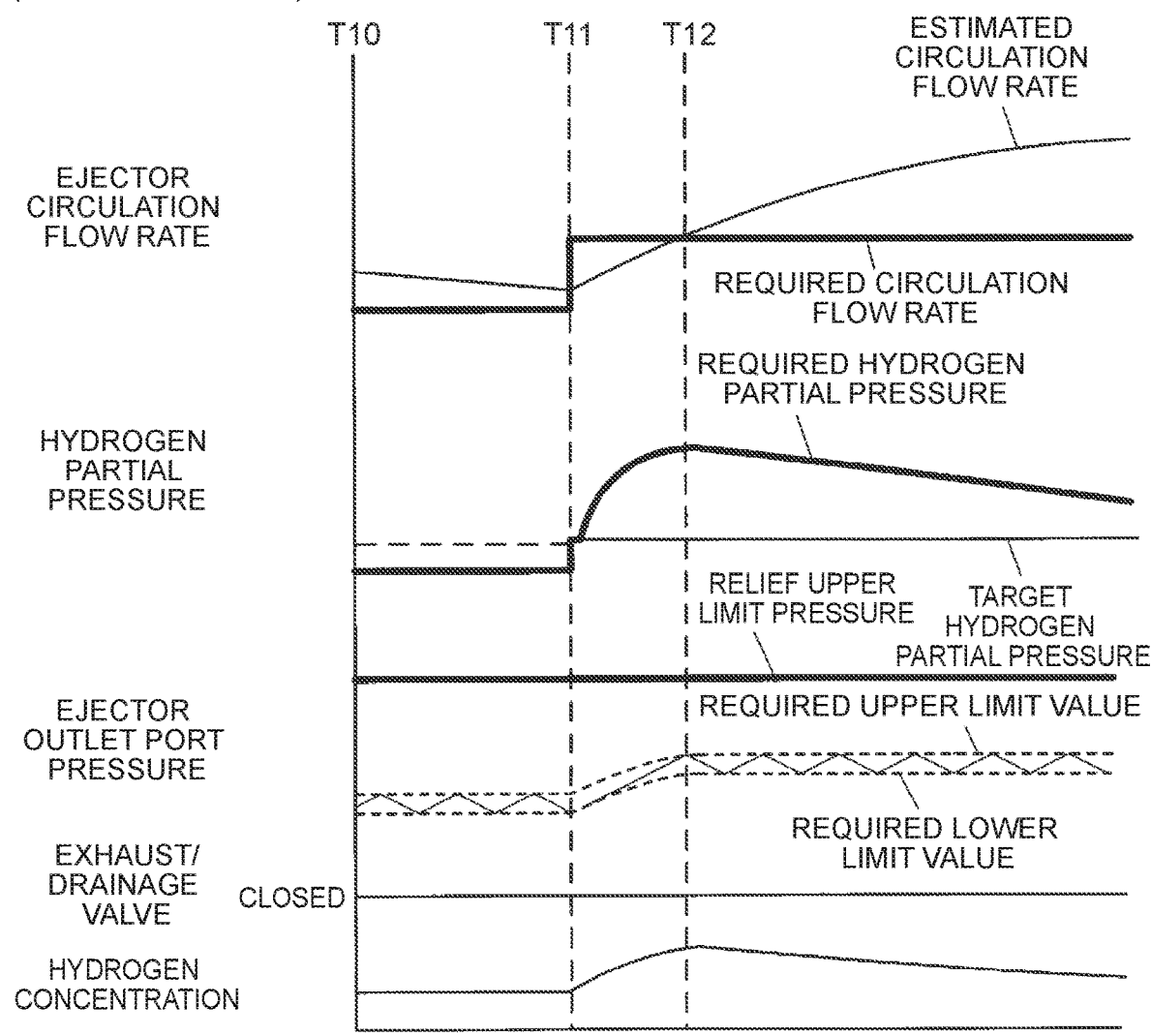
FIG. 4 is a time chart illustrating a target hydrogen partial pressure and operation of an exhaust-drainage valve for a case where a required load is low according to the present embodiment.
Figure 5:
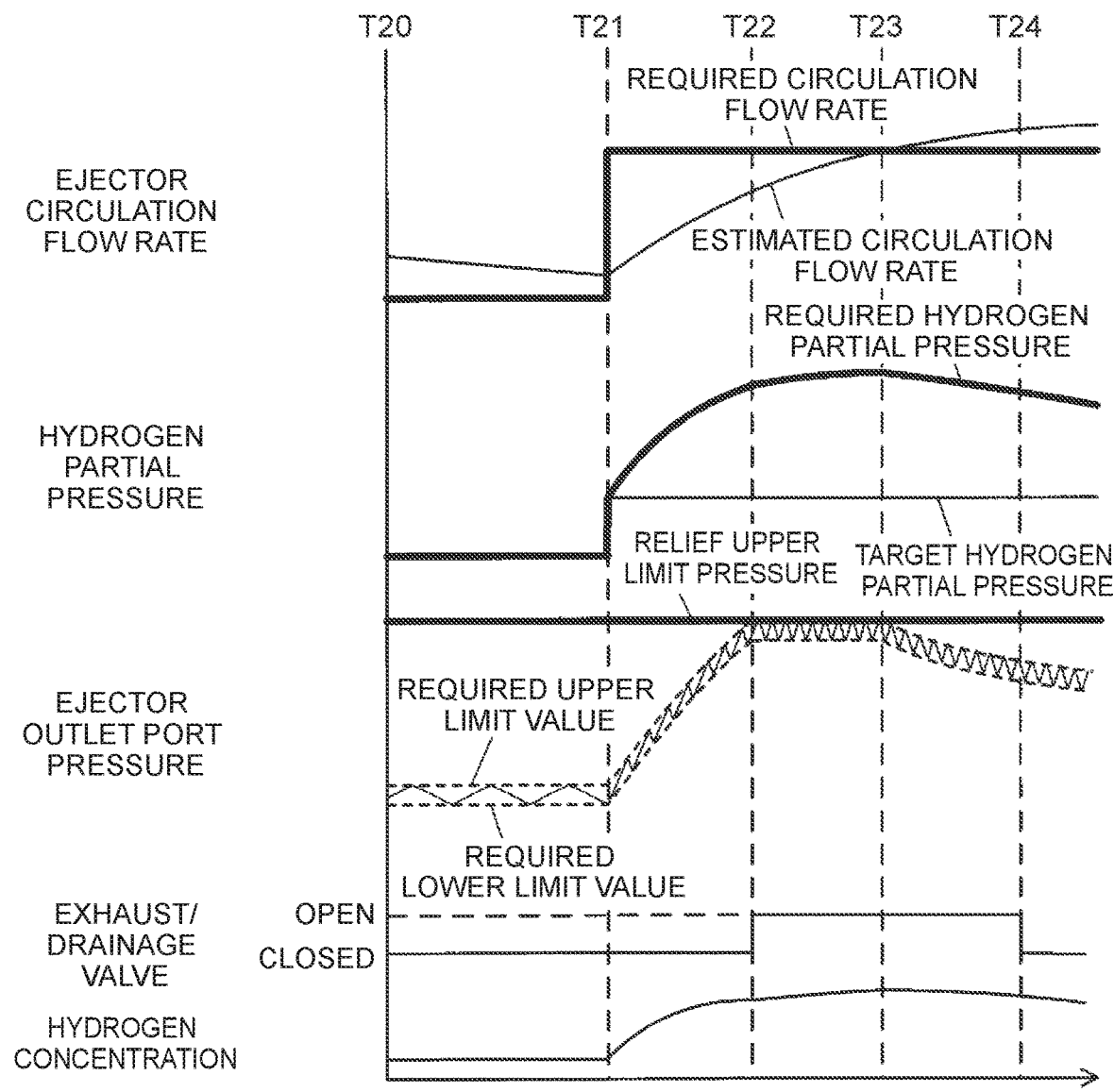
FIG. 5 is a time chart illustrating the target hydrogen partial pressure and operation of the exhaust-drainage valve for a case where the required load is high according to the present embodiment.

Specific Cases A and B: FIGS. 4 and 5

Subsequently, specific cases A and B where the process in FIG. 3 is executed will be described with reference to FIGS. 4 and 5, respectively. In FIGS. 4 and 5, the required load and operation of the injector 20 are omitted for ease of viewing. The hydrogen concentration in FIGS. 4 and 5 indicates the concentration of hydrogen at the outlet port of the ejector 30. In FIGS. 4 and 5, in addition, the required circulation flow rate, the required hydrogen partial pressure, and the relief upper limit pressure value are each indicated by a thick line.

Case A: FIG. 4

In case A, the required load after being varied (i.e. the required load at time T11) is low. At time T10, the ECU 100 calculates the required circulation flow rate based on the required load at time T10 (step S10 in FIG. 2), and calculates an estimated circulation flow rate based on the pressure difference at time T10 (step S12). Next, the ECU 100 determines that the estimated circulation flow rate is equal to or higher than the required circulation flow rate (NO in step S14), and determines that the required hydrogen partial pressure and the target hydrogen partial pressure are equal to each other (YES in step S30). In this case, the ECU 100 does not change the required hydrogen partial pressure.

At time T11, the accelerator operation amount which is operated by a user becomes larger, and the required load becomes higher, for example. At the timing when the required load is varied, the ECU 100 changes the required hydrogen partial pressure from a target hydrogen partial pressure corresponding to the required load before being varied to a target hydrogen partial pressure corresponding to the required load after being varied. The ECU 100 calculates the required circulation flow rate based on the required load at time T11 (step S10), and calculates an estimated circulation flow rate based on the pressure difference at time T11 (step S12). Next, the ECU 100 determines that the estimated circulation flow rate is lower than the required circulation flow rate (YES in step S14). In this case, the ECU 100 increases the required hydrogen partial pressure at time T11. The ECU 100 calculates an additional hydrogen partial pressure based on an insufficient flow rate obtained by subtracting the estimated circulation flow rate from the required circulation flow rate. Next, the ECU 100 adds the additional hydrogen partial pressure to the present required hydrogen partial pressure to calculate a new required hydrogen partial pressure (step S20). Next, the ECU 100 calculates a required upper limit value and a required lower limit value which correspond to the new required hydrogen partial pressure (step S22), and determines that the required upper limit value is equal to or less than the relief upper limit pressure value (NO in step S24).

During a period from time T11 to time T12, the same process as described above is executed so that the required hydrogen partial pressure, the required upper limit value, and the required lower limit value are increased. As the required upper limit value and the required lower limit value are increased, the ejector outlet port pressure is increased, and the hydrogen concentration at the outlet port of the ejector 30 is also increased.

At time T12, the ECU 100 determines that the estimated circulation flow rate is equal to or higher than the required circulation flow rate (NO in step S14), and determines that the required hydrogen partial pressure and the target hydrogen partial pressure are different from each other (NO in step S30). In this case, the ECU 100 decreases the required hydrogen partial pressure (step S32). After time T12, the same process is executed so that the required hydrogen partial pressure, the required upper limit value, and the required lower limit value are decreased. As the required upper limit value and the required lower limit value are reduced, the ejector outlet port pressure is reduced, and the hydrogen concentration at the outlet port of the ejector 30 is also reduced.

Case B: FIG. 5

In case B, the required load after being varied (i.e. the required load at time T21) is high. At time T20, the ECU 100 calculates the required circulation flow rate based on the required load at time T20 (step S10 in FIG. 2), and calculates an estimated circulation flow rate based on the pressure difference at time T20 (step S12). Next, the ECU 100 determines that the estimated circulation flow rate is equal to or higher than the required circulation flow rate (NO in step S14), and determines that the required hydrogen partial pressure and the target hydrogen partial pressure are equal to each other (YES in step S30). In this case, the ECU 100 does not change the required hydrogen partial pressure.

At time T21, the accelerator operation amount which is operated by a user becomes larger, and the required load becomes higher, for example. At the timing when the required load is varied, the ECU 100 changes the required hydrogen partial pressure from a target hydrogen partial pressure corresponding to the required load before being varied to a target hydrogen partial pressure corresponding to the required load after being varied. The content of the process executed at time T21 is the same as the content of the process executed at time T11 in FIG. 4 except for the difference in the magnitude of the additional hydrogen partial pressure.

At time T22, the ECU 100 determines that the estimated circulation flow rate is lower than the required circulation flow rate (YES in step S14). In this case, the ECU 100 increases the required hydrogen partial pressure at time T22. The ECU 100 calculates an additional hydrogen partial pressure based on an insufficient flow rate obtained by subtracting the estimated circulation flow rate from the required circulation flow rate. Next, the ECU 100 adds the additional hydrogen partial pressure to the present required hydrogen partial pressure to calculate a new required hydrogen partial pressure (step S20). Next, the ECU 100 calculates a required upper limit value and a required lower limit value which correspond to the new required hydrogen partial pressure (step S22). At time T22, the required upper limit value becomes more than the relief upper limit pressure value. In this case, the ECU 100 determines that the required upper limit value is equal to or more than the relief upper limit pressure value (YES in step S24), and specifies the relief upper limit pressure value as the required upper limit value, and specifies, as the required lower limit value, a pressure value that is less than the relief upper limit pressure value by a predetermined value (step S26). Next, the ECU 100 switches the exhaust-drainage valve 58 to the open state (step S28). A nitrogen gas contained in the fuel off gas in the gas-liquid separator 50 is exhausted to the outside by switching the exhaust-drainage valve 58 to the open state. Consequently, the hydrogen partial pressure at the outlet port of the ejector 30 is increased, and the hydrogen concentration at the outlet port of the ejector 30 is increased.

At time T23, the ECU 100 determines that the estimated circulation flow rate is equal to or higher than the required circulation flow rate (NO in step S14). The content of the process executed at time T23 is the same as the content of the process executed at time T12 in FIG. 4. After time T23, the same process is executed so that the required hydrogen partial pressure, the required upper limit value, and the required lower limit value are reduced. At time T24, in addition, the ECU 100 determines that the required upper limit value has become less than the relief upper limit pressure value by the second predetermined value or more, and switches the exhaust-drainage valve 58 from the open state to the closed state.

As illustrated in FIGS. 4 and 5, the ECU 100 increases the required hydrogen partial pressure when the estimated circulation flow rate is the required circulation flow rate (time T11 to time T12 in FIG. 4, and time T21 to time T23 in FIG. 5). The flow rate of a fuel gas supplied from the injector 20 to the fuel cell stack 40 is increased by increasing the required hydrogen partial pressure. Consequently, the amount of hydrogen to be supplied to the fuel cell stack 40 is increased, and the hydrogen concentration at the outlet port of the ejector 30 is increased. With such a configuration, it is possible to suppress a shortage of hydrogen which can be used for power generation by the fuel cell stack 40, and suppress degradation of the fuel cell stack 40, in a situation in which the estimated circulation flow rate is lower than the required circulation flow rate. In addition, it is possible to suppress supply of an unnecessarily large amount of fuel gas to the fuel cell stack 40 in a situation in which the estimated circulation flow rate is equal to or higher than the required circulation flow rate. Thus, the fuel efficiency of the fuel cell system 2 can be improved.

As illustrated in FIG. 5, in addition, the ECU 100 switches the exhaust-drainage valve 58 to the open state when the estimated circulation flow rate is lower than the required circulation flow rate and the ejector outlet port pressure is equal to or more than the relief upper limit pressure value (time T22 to time T23). When the exhaust-drainage valve 58 is switched to the open state, a nitrogen gas contained in the fuel off gas in the gas-liquid separator 50 is exhausted to the outside through the exhaust-drainage path 56. Therefore, the hydrogen concentration at the outlet port of the ejector 30 can be increased. Also with such a configuration, it is possible to suppress a shortage of hydrogen that can be used for power generation by the fuel cell stack 40.

While a specific embodiment of the present disclosure has been described in detail above, the embodiment is merely an illustration, and does not limit the scope of the claims. The technology described in the claims includes various modifications and variations of the specific embodiment described above.

First Modification

The fuel cell system 2 may include at least one of a pressure sensor provided in the third fuel supply path 32 and a pressure sensor provided in the gas circulation path 52. With such a configuration, the precision in calculating the pressure difference between the ejector inlet port pressure and the ejector outlet port pressure can be improved.

Second Modification

Steps S24 and S26 in FIG. 3 may be omitted.

Third Modification

The ECU 100 may determine whether a difference obtained by subtracting the estimated circulation flow rate from the required circulation flow rate is more than a predetermined flow rate after step S14 in FIG. 3, and execute the processes in and after step S20 only when the difference is more than the predetermined flow rate.

The technical elements described herein or illustrated in the drawings exhibit technical usefulness alone or in various combinations, and are not limited to the embodiment. In addition, the technology described herein or illustrated in the drawings may achieve a plurality of objects at the same time, and has technical usefulness by achieving one of the objects itself

What is claimed is:

1. A fuel cell system comprising:
a fuel cell stack;
a fuel gas supply path through which a fuel gas is supplied to the fuel cell stack;
an injector provided in the fuel gas supply path;
an ejector provided in the fuel gas supply path and provided between the injector and the fuel cell stack;
a circulation path through which a fuel off gas discharged from the fuel cell stack is supplied to the ejector;
a pressure difference detection unit configured to detect a pressure difference between an ejector inlet port pressure that is a pressure in the circulation path between the fuel cell stack and the ejector, and an ejector outlet port pressure that is a pressure in the fuel gas supply path between the ejector and the fuel cell stack; and
a control device,
wherein the control device is configured to
calculate a required circulation flow rate that is a flow rate required for the fuel off gas to be supplied from the fuel cell stack to the ejector, based on a required load for the fuel cell stack,
calculate an estimated circulation flow rate that is an estimated value of a flow rate of the fuel off gas supplied from the fuel cell stack to the ejector, based on the required load and the pressure difference, and
increase a flow rate of the fuel gas to be supplied from the injector to the fuel cell stack when the estimated circulation flow rate is lower than the required circulation flow rate;
the fuel system further comprising:
a gas-liquid separator provided in the circulation path to separate liquid water contained in the fuel off gas and store the liquid water;
an exhaust-drainage path connected to the gas-liquid separator; and
an exhaust-drainage valve provided in the exhaust-drainage path,
wherein the control device is configured to:
specify a required upper limit value and a required lower limit value which correspond to the ejector outlet port pressure based on the required load,
stop driving the injector when the ejector outlet port pressure is equal to or more than the required upper limit value with the injector in a driven state, and
start driving the injector when the ejector outlet port pressure is equal to or less than the required lower limit value with the injector in a stopped state, and
wherein the control device switches the exhaust-drainage valve to an open state to exhaust a nitrogen gas contained in the fuel off gas in the gas-liquid separator to outside when the estimated circulation flow rate is lower than the required circulation flow rate and the required upper limit value specified based on the required load is equal to or more than a predetermined upper limit pressure value.

* * * * *